(12) United States Patent
Ukigaya (10) Patent No.: US 7,184,196 B2
(45) Date of Patent: Feb. 27, 2007

(54) PROCESS FOR PRODUCING ELECTROPHORETIC DISPLAY

(75) Inventor: Nobutaka Ukigaya, Chigasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 613 days.

(21) Appl. No.: 10/765,490

(22) Filed: Jan. 26, 2004

(65) Prior Publication Data

US 2004/0216836 A1  Nov. 4, 2004

(30) Foreign Application Priority Data

Jan. 29, 2003   (JP)   ............ 2003-0121007

(51) Int. Cl.
*G02B 26/00*   (2006.01)
*G09G 3/34*    (2006.01)
*G03G 17/04*   (2006.01)

(52) U.S. Cl. .................. 359/296; 345/107; 430/32
(58) Field of Classification Search ................ 359/296; 345/107; 430/32
See application file for complete search history.

(56) References Cited

U.S. PATENT DOCUMENTS 6,524,153 B1 * 2/2003 Ikeda et al. .................. 445/24

2002/0008898 A1   1/2002  Katase
2003/0007238 A1   1/2003  Liang et al.

FOREIGN PATENT DOCUMENTS

| EP | 0 240 615 | 10/1987 |
|----|-----------|---------|
| JP | 64-86117  | 3/1989  |
| JP | 2-223935  | 9/1990  |
| JP | 8-502599  | 3/1996  |

\* cited by examiner

*Primary Examiner*—Ricky Mack
*Assistant Examiner*—William Choi
(74) *Attorney, Agent, or Firm*—Morgan & Finnegan, LLP (57) ABSTRACT

An electrophoretic display of the type wherein a dispersion liquid for migration and a plurality of charged particles are sandwiched between a first substrate and a second substrate is produced through a process comprising: a latent image forming step of forming an electrostatic latent image on an adsorption member; a developing step of causing the adsorption member to contact the dispersion liquid in which the charged particles are dispersed, thereby to attach the charged particles together with the dispersion liquid onto a surface of the adsorption member on which the latent image is formed; a transfer step of transferring the charged particles from the surface of the adsorption member to the second substrate together with the dispersion liquid; and a sealing step of bonding the first substrate to the second substrate to seal the charged particles and the dispersion liquid, therebetween.

6 Claims, 4 Drawing Sheets

PROCESS FOR PRODUCING ELECTROPHORETIC DISPLAY

FIELD OF THE INVENTION AND RELATED ART

The present invention relates to a production process of an electrophoretic display which effects display by moving charged particles.

In the electrophoretic display, the following points 1) to 3) are important in improving display characteristics, particularly suppressing display unevenness:
1) to uniformize an amount of electric charge possessed by charged particles in a dispersion liquid for migration,
2) to uniformize an in-plane density of the charged particles, and
3) to dispose the charged particles at a desired position.

In this regard, proposals have been made with respect to suppression of a charge in in-plane density of the charged particles after injection or disposition of the charged particles at a uniform in-plane density in, e.g., Japanese Laid-Open Patent Applications (Kokai) Sho 64-86117, (Kokai) Hei 2-223935 and (Kohyo) Hei 8-502599.

However, there was a limit in reducing a display unevenness-only by uniformizing the charge amount and uniformizing the in-plane density of the charged particles as described above.

SUMMARY OF THE INVENTION

Accordingly, an object of the present invention is to provide a process for producing an electrophoretic display with good image display qualities.

According to the present invention, there is provided a process for producing an electrophoretic display of the type wherein a dispersion liquid for migration and a plurality of charged particles are sandwiched between a first substrate and a second substrate, said process comprising:

a latent image forming step of forming an electrostatic latent image on an adsorption member, a developing step of causing the adsorption member to contact the dispersion liquid in which the charged particles are dispersed, thereby to attach the charged particles together with the dispersion liquid onto a surface of the adsorption member on which the latent image is formed, a transfer step of transferring the charged particles from the surface of the adsorption member to the second substrate together with the dispersion liquid, and a sealing step of bonding the first substrate to the second substrate to seal the charged particles and the dispersion liquid, therebetween.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Embodiments of the present invention will be described with reference to FIGS. 1 to 6.

(1) First, a structure of an electrophoretic display to be produced through the production process according to the present invention will be described with reference to FIGS. 5 and 6.

The electrophoretic display to be produced by the production process of the present invention (indicated by D1 in FIG. 5 and D2 in FIG. 6) includes a pair of substrates 1a and 1b disposed with a predetermined spacing, a dispersion liquid 2 for migration (electrophoresis) disposed at the spacing between the substrates 1a and 1b, a plurality of charged particles 3 dispersed in the dispersion liquid 2, and a first electrode 4a (14a) and a second electrode 4b (14b) disposed along the dispersion liquid 2. Through these electrodes 4a and 4b (14a and 14b), an electric field is applied to the dispersion liquid 2 to move the charged particles 3, thus effecting image display.

This display apparatus (electrophoretic display) may be of the transmission type (for recognizing an image by utilizing light transmitted through the display apparatus) or the reflection type (for recognizing an image by utilizing light reflected by the display apparatus). In the case of the transmission-type display apparatus, it is necessary to form the substrates 1a and 1b, the electrodes 4a, 4b, 14a and 14b, the dispersion liquid 2 and other members, of a light-transmission material. In the case of the reflection-type display apparatus, it is necessary to form the substrate and electrode(s) and other members to be disposed on the light incident side (i.e., a viewer side), of a light-transmission material.

As a material for the substrates 1a and 1b, it is possible to use glass; plastics, such as polyethylene terephthalate (PET) and polyether sulfone (PES); and metals, such as stainless steel. When the light transmission property is required, glass or the like may be used, and when a flexibility is ensured, a film of PET or PES or a thin plate of metal may be used.

Figure 5:
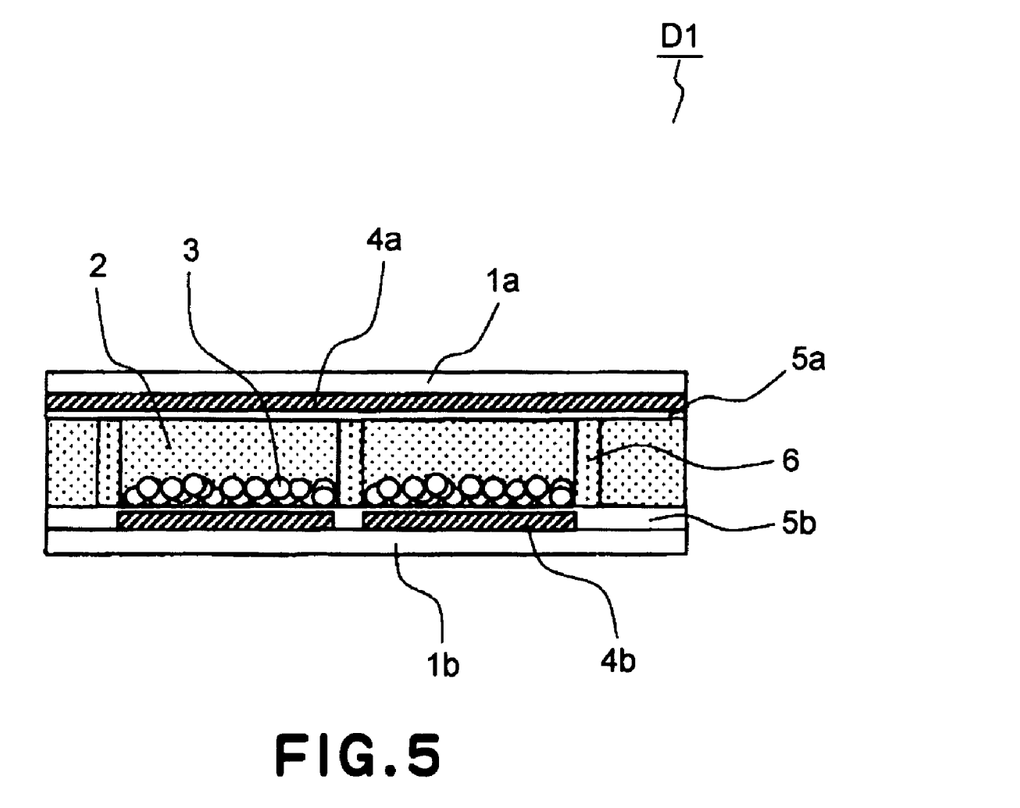
FIGS. 5 and 6 are respectively a sectional view showing an embodiment of a structure of an electrophoretic display to be produced by the production process of the present invention.
Figure 6:
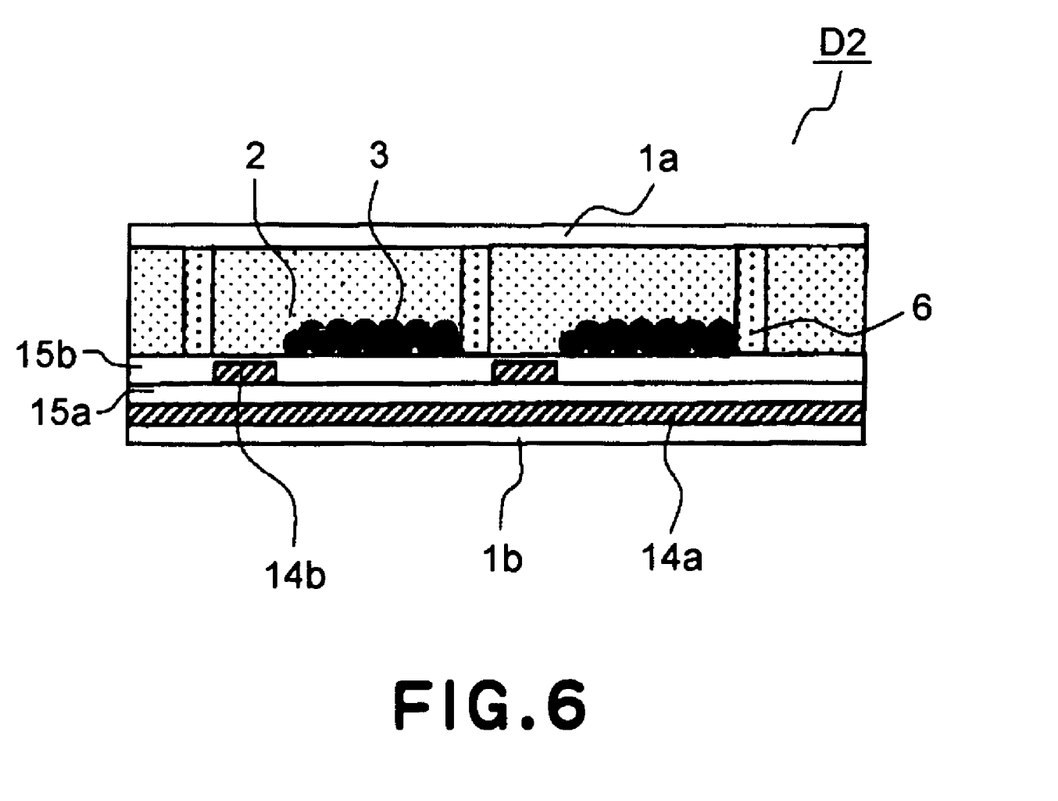

The first electrode and the second electrode may be supported by different substrates 1a and 1b, respectively, as indicated by symbols 4a and 4b in FIG. 5, or supported by one substrate 1b as indicated by symbols 14a and 14b in FIG. 6. These electrodes may be formed of ITO (indium tin oxide) or metal such as Al, Ag and Ti. When the light transmission property is required. ITO or the like may be used, and when the light transmission property is not required, the metals may be used. When the electrode is used for displaying black, TiC may be used.

On the electrodes 4a, 4b, 14a and 14b, insulating layers 5a, 5b, 15a and 15b are disposed to cover the electrodes, respectively. The insulating layers 5a, 5b, 15a and 15b may be formed of organic materials, such as acrylic resin, polyimide resin, and polycarbonate, or of an inorganic film. In the case of the reflection-type display apparatus, the insulating layer(s) disposed on the rear side may be formed as a scattering layer by adding alumina ($Al_2O_3$) or titanium oxide ($TiO_2$).

At the spacing between the substrates 1a and 1b, a partition member 6 may be disposed so as to define adjacent pixels. The partition member 6 may be formed of rubbers, such as silicone rubber, fluorocarbon rubber and acrylic rubber; or photosensitive resins, such as acrylic resin and polyimide resin.

As the charged particles, it is possible to suitably use particles comprising, as a main component, a polymer (resin) such as polystyrene or polyethylene, and as an additive, a colorant such as carbon; particles of pigments, such as titanium oxide and aluminum oxide; and polymer (resin)-coated or the like can be mixed in the charged particles as desired. A particle size of the charged particles may be in the rang of 0.1–15 µm. The charged particles are charged electrically to a predetermined polarity.

As the dispersion liquid 2 for migration, it is possible to use a liquid, capable of appropriately charging the charged particles and having a low viscosity, such as silicone oil, xylene, toluene or isoparaffin. In order to match a specific gravity of the dispersion liquid 2 with that of the electrophoretic particles 3, it is possible to use a dispersion liquid 2 having a larger specific gravity in combination, if necessary.

In the above described electrophoretic display (display apparatus), display is effected by utilizing a difference in color between the case of attracting the charged particles 3 to the first electrode 4a or 14a and the case of attracting the charged particles 3 to the second electrode 4b or 14b.

Accordingly, it is necessary to color the constitutional members of the display apparatus in advance.

For example, in the case of the electrophoretic display shown in FIG. 5, the dispersion liquid 2 is colored a certain color, and the charged particles 3 are colored a color different from the certain color. When the charged particles 3 are attracted to the first electrode 4a, the color of the charged particles 3 is visually identified. On the other hand, when the charged particles 3 are attracted to the second electrode 4b, the color of the dispersion liquid 2 is visually identified.

In the case of the electrophoretic display shown in FIG. 6, the dispersion liquid 2 is made transparent so that the charged particles 3 are visually identified from the substrate 1a side, and the charged particles 3 and a predetermined region (e.g., a region other than a region where the second electrode 14b is disposed) are colored different colors each other. When the charged particles 3 are attracted to the first electrode 14a, the color of the charged particles 3 is visually identified. On the other hand, when the charged particles are attracted to the second electrode 14b, the color of the predetermined region is visually identified.

The display of image may be performed at a monocolor display mode, a two-color display mode, or a full-color display mode.

Herein, the monocolor display mode is such a mode that image display is performed at all the pixels by switching between first color and background color. The two-color display mode is such a mode that image display is performed by disposing pixels for effecting switching between first color and background color and pixels for effecting switching between second color and background color. The full-color display mode is such a mode that, e.g., image display is performed by disposing pixels for effecting switching between first color and background color, pixels for effecting switching between second color and background color, and pixels for effecting switching between third color and background color.

In the case of performing the two-color display mode or the full-color display mode, it is possible to adopt a method wherein the color of charged particles 3 is changed pixel by pixel (e.g., red/white display is performed by using a plurality of set of two adjacent pixels including a pixel at which the charged particles 3 are colored red and another pixel at which the charged particles 3 are colored white); a method wherein the color of the dispersion liquid 2 is changed pixel by pixel; and a method wherein a color filter is disposed.

Next, an embodiment of a driving method for the electrophoretic display used in the present invention will be described.

In the case of the electrophoretic display shown in FIG. 5, display is performed by applying a voltage between the electrodes. For example, the first electrode 4a is grounded and the respective second electrodes 4b are supplied with a positive or negative voltage when the charged particles 3 are positively charged, the charged particles 3 are moved onto the electrode having a relatively lower electric charge. At this time, it is possible to effect white display if the charged particles 3 are white an attracted to the first electrode 4a. On the other hand, if the charged particles 3 gather on the second electrode 4b, the color of the dispersion liquid 2 can be displayed. The color of the dispersion liquid 2 is selected so that it can sufficiently hide the color of the charged particles 3.

In the case of the electrophoretic display shown in FIG. 6, display is performed by applying a voltage between the electrodes. For example, the first electrode 14a is grounded and the respective second electrodes 14b are supplied with a positive or negative voltage when the charged particles 3 are negatively charged, the charged particles 3 gather onto the electrode having a relatively higher electric charge. At this time, if the charged particles 3 and the second electrode 14b are black and the charged particles 3 are moved onto the first electrode 14a, it is possible to effect dark black display. The resultant contrast at this time largely depends on an areal ratio between the first and second electrodes 14a and 14b. For this reason, it is necessary to reduce an exposed area of the second electrode 14b relative to that of the first electrode 14a in order to enhance the contrast. Generally, the areal ratio of the second electrode to the first electrode may be 1:2 to 1:4. The applied voltage may vary depending on the amount of electric charge of the charged particles 3 and an electrode pitch but may generally be 1–100 V.

(2) Next, a production apparatus for the electrophoretic display of the present invention will be described.

Figure 1:
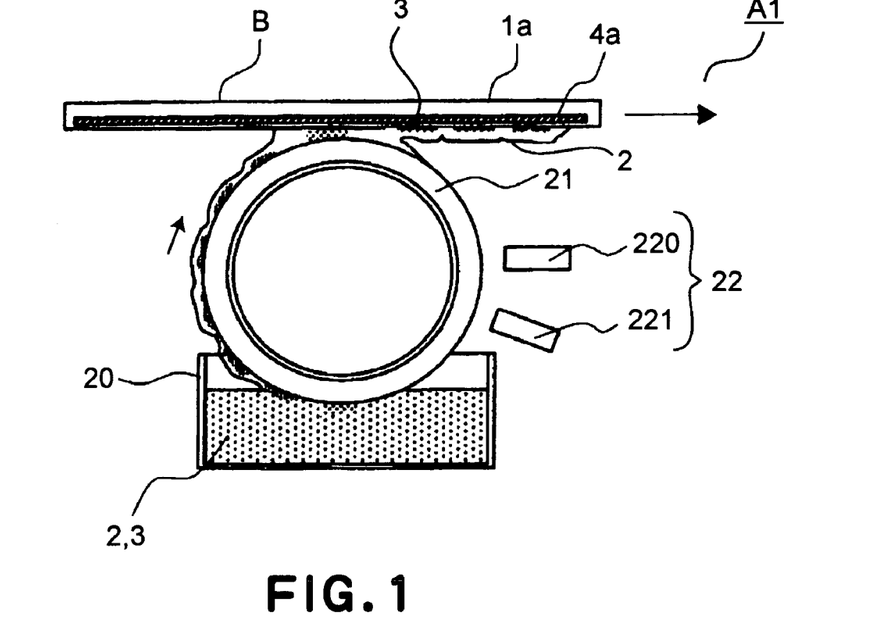
FIGS. 1 to 4 are respectively a schematic illustration for explaining an embodiment of the process for producing an electrophoretic display according to the present invention.

The production apparatus for the electrophoretic display according to the present invention is used for producing such an electrophoretic display that a dispersion liquid 2 for migration and charged particles 3 are filled on a first substrate 1a. As shown in FIG. 1, a production apparatus Al includes a storage tank 20 containing the charged particles 3 and the dispersion liquid 2, on adsorption member 21 capable of forming thereon an electrostatic latent image, and an electrostatic latent image forming means 22 for forming an electrostatic latent image on the adsorption member 21. In the production apparatus Al, the adsorption member 21 on which the electrostatic latent image is formed by using the electrostatic latent image forming means 22 is immersed into the dispersion liquid 2 in the storage tank 20 to attach the charged particles 3 to the adsorption member 21, and then the charged particles 3 attached to the adsorption member 21 are transferred onto a first substrate B.

The adsorption member 21 may be designed to be movable to at least three positions including a first position opposite to the electrostatic latent image forming means 22, a second position at which the adsorption member 21 is immersed in the dispersion liquid 2, and a third position opposite to the first substrate B. More specifically, the adsorption member 21 may be desired so that the electrostatic latent image is formed at the first position, developed at the second position, and transferred onto the first substrate at the third position.

Figure 3:
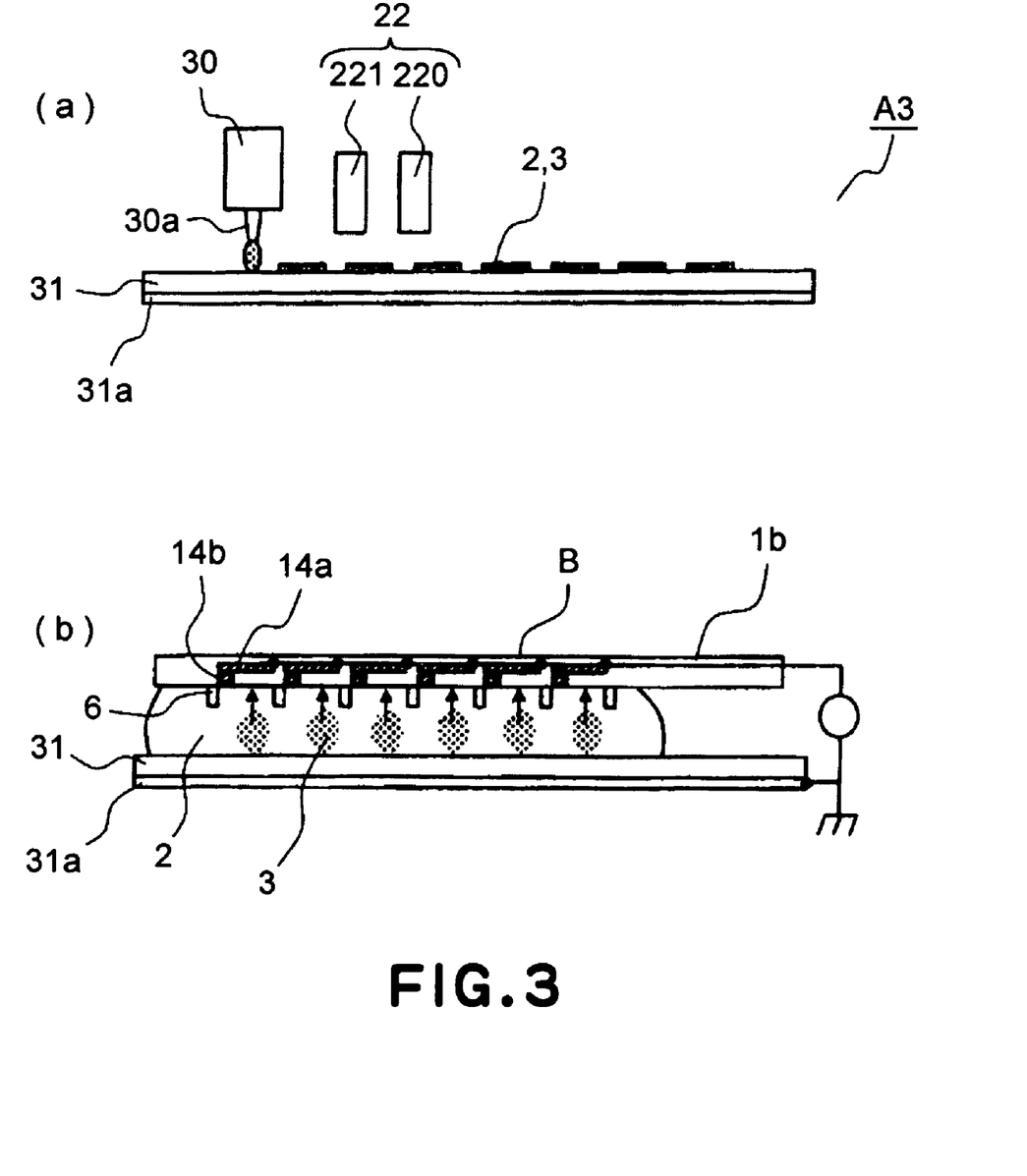

The adsorption member 21 has a roller shape as shown in FIG. 1 and is rotated to the first, second and third positions in this order in a direction of an arrow but may have other shapes (such as a plate shape shown in FIG. 3 as a member 31, and a polygonal prism). In the case of using the roller-shaped adsorption member 21, the storage tank 20 and the electrostatic latent image 21. Further, it is possible to use a photosensitive member as the adsorption member 21.

The electrostatic latent image forming means may include a charger 220 for uniformly electrically charging the adsorption member 21, and a light irradiation device 221 for irradiating the adsorption member 21 with light.

The adsorption member 21 may be provided with charge-removing means therefor after the transfer operation and cleaning means for removing residual charged particles 3 and residual dispersion liquid 2 remaining on the adsorption member 21 after the transfer operation.

Incidentally, the storage tank 20 shown in FIG. 1 is disposed at a lower portion of the adsorption member 21 and has an opening which is largely opened to the adsorption member 21 so that the adsorption member 21 can be immersed in the storage tank 20 but may be designed as a storage tank 30 as shown in FIG. 3(a) so that it is provided with a nozzle 30a at its bottom portion and is moved horizontally above an adsorption member 31.

(3) Then, the production process of electrophoretic display of the present invention will be described.

The production process of electrophoretic display according to the present invention principally comprises an operation of filling the dispersion liquid 2 for migration and the plurality of charged particles 3 and the first substrate 1a (or 1b) and an operation of bonding the second substrate 1b (or 1a) to the first substrate 1a (or 1b) so as to sandwich the dispersion liquid 2 and the charged particles 3 therebetween. More specifically, the filling operation of the dispersion liquid 2 and the charged particles 3 onto the first substrate (B shown in FIG. 1) includes an electrostatic latent image forming step of forming an electrostatic latent image on an adsorption member 21 (or 31), a developing step of attaching the charged particles 3 and the dispersion liquid 2 onto the adsorption member 21 (or 31), and a transfer step of transferring the charged particles 3 and the dispersion liquid 2, which have been attached to the adsorption member 21 (or 31), onto the first substrate B. The bonding operation performed thereafter includes a step of bonding the second substrate to the above treated first substrate B.

Herein, the "first substrate" means a substrate by which the charged particles 3 are adsorbed through the transfer step, and the "second substrate" means a substrate which has not been subjected to the transfer step.

In the present invention, the transfer of the charged particles 3 and the dispersion liquid 2 may be effected onto either of a display substrate (disposed on a viewer side) and a rear substrate (disposed on a side opposite from the viewer side). In other words, either of the first substrate and the second substrate may be used as the display substrate or the rear substrate.

In the case of producing the electrophoretic display shown in FIG. 5, the transfer may be effected onto either of the substrate 1a (or which the first electrode 4a is formed) and the substrate 1b (or which the second substrate 4b is formed), as the first substrate. In the case of producing the electrophoretic display shown in FIG. 6, the transfer may be effected onto either of the substrate 1 (or which the first and second electrodes 14a and 14b are formed) and the substrate 1b (on which the first and second electrodes 14a and 14b are not formed), as the first substrate. However, in a preferred embodiment, the transfer is effected onto the substrate provided with the electrode(s) (the substrate 1a shown in FIG. 5 or the substrate 1b shown in FIG. 6) in such a manner that at least one of the first and second electrodes are formed on the first substrate before subjected to the transfer step and supplied with a voltage for transfer in the transfer step. Further, immediately before the transfer step, the electrostatic latent image remaining on the adsorption member may be removed. By doing so, it is possible to remove an adsorption force of the charged particles 3 to the adsorption member, whereby the transfer of the charged particles 3 to the adsorption member can be performed smoothly. Incidentally, a (closest) gap between the substrate surface and the adsorption member may preferably be 1–500 μm.

The surface of the adsorption member may preferably have a wettability to the adsorption liquid identical to that of the surface of the first substrate to which the dispersion liquid is to be transferred together with the charged particles. More specifically, it is preferable that a surface tension of the adsorption member is substantially equal to that of the first substrate or that a difference between these surface potentials is not more than 10 dyn/cm$^2$. As a result, after the adsorption step, the dispersion liquid for migration is subjected to the transfer step in such a state that an adsorption surface is wet by the dispersion liquid, so that the dispersion liquid is transferred to the first substrate together with the charged particles and the second substrate is bonded the first substrate with no filling step of the dispersion liquid.

In the case where adjacent pixels are partitioned by the partition member 6 as described above, the partition member 6 may preferably be formed on the first substrate B before subjected to the transfer step.

Further, in the case where the charged particles 3 are disposed at pixels so that the color thereof is changed pixel by pixel, it is preferable that a plurality of adsorption members are used for the number of colors of the charged particles 3 (21 shown in FIG. 4) and are respectively subjected to the electrostatic latent image forming step and the developing step describe above, whereby the charged particles 3 of different colors are attached to the adsorption members, respectively. The above described transfer step is performed with respect to the respective adsorption members, whereby the charged particles of different colors are transferred together with the dispersion liquid 2 onto the first substrate B described above and thereafter, the above describe bonding step of substrates is effected.

After completion of the transfer step, a charge removing step of remaining the electrostatic latent image by charge-removing electric charges from the surface of the adsorption member 21 or 31 or a cleaning step of removing the charged particles 3 and the dispersion liquid 2 remaining on the adsorption member 21 or 31 may be effected. The removal of the electrostatic latent image may be performed by irradiating the adsorption member with light.

On the other hand, the developing step described above may be effected by immersing the adsorption member in the dispersion liquid 2 in which the charged particles 3 are dispersed. By immersing the adsorption member in the dispersion liquid 2, the charged particles 3 are electrophoretically moved toward the electrostatic latent image in accordance with a potential gradient created by the electric-charge latent image (electrostatic latent image). In the process of this migration, it is possible to effect classification of the charged particles 3. Hereinbelow, the classification method for the charged particles 3 will be described.

One of the classification methods is a method wherein a time of immersion of the adsorption member 21 in the dispersion liquid 2 for migration is restricted. The amount of electric charge of the charged particles 3 migrating in the dispersion liquid 2 vary and the migration speed thereof is different depending on the charge amount, so that the charged particles 3 having a smaller charge amount has a relatively slower migration speed. For this reason, by setting the limit to the immersion time of the adsorption member in the dispersion liquid, it becomes possible to control a distribution of charge amount of the charged particles 3 attached to the adsorption member. In that case, as shown by a symbol 21a in FIG. 2, a adsorption member side electrode is disposed on the adsorption member side, and as shown by a symbol 23, an adsorption control electrode is disposed on the dispersion liquid side, so that the adsorption of the charged particles 3 to the adsorption member 21 can be controlled based on application of a voltage to these electrodes (the charged particles 3 can be classified by controlling the migration speed). Hereinbelow, details thereof will be described. The voltage applied to the adsorption control electrode may have a polarity identical or opposite to that of the charged particles 3 in the dispersion liquid 2. In the case of the identical polarity, the migration speed of the charged particles is accelerate to shorten the immersion time. In the case of the opposite polarity, it is possible to suppress the adsoprtion of the charged particles 3 to the adsorption member.

Another method is a method wherein a rotation speed of the adsorption member 21 is controlled. There is a relationship between a magnitude of charge amount of the charged particles 3 and an adsorption force of the charged particles 3 to the adsorption member 21. There is such a tendency that the adsorption force of the charged particles 3 to the adsorption member 21 is larger with a larger charge amount. On the other hand, by the rotation of the adsorption member 21, convection of the dispersion liquid 2 occurs at the boundary of the adsorption member. As the rotation is faster, the convention at the adsorption member boundary becomes intense. Based on these relationships, by the influence of the convection of the dispersion liquid 2 in the vicinity of the adsorption member boundary created by utilizing the rotation of the adsorption member 21, it is possible to remove the charged particles having a weaker adsoprtion force through peeling-off thereof from the adsorption member 21. Accordingly, it is possible to control the charge amount distribution of the charged particles 3 attached to the adsorption member 21 by controlling the rotation speed.

In the case where the color of the charged particles 3 is changed pixel by pixel in the two-color or full-color display mode, it is preferable that the above described developing step is performed by immersing the adsorption member in the dispersion liquid 2, in which the charged particles 3 and an ultraviolet polymerizable compound are dispersed, to attach not only the charged particles 3 and the dispersion liquid 2 but also the ultraviolet polymerizable compound to the adsorption member; the partition member 6 is formed on the first substrate B; the charged particles 3 and the ultraviolet polymerizable compound are transferred together with the dispersion liquid 2 onto the first substrate B by the transfer step; and the ultraviolet polymerizable compound is irradiated with ultraviolet rays before performing the above-mentioned bonding step, thereby to form a film. Hereinbelow, details thereof will be described.

An important factor in the case where the color of the charged particles is changed pixel by pixel is that the charged particles of different colors are not mixed with each other by preventing the charged particles 3 from migrating toward another pixel portion. This is because if the once arranged particles are moved from the predetermined area, it becomes impossible to create a predetermined color at the time of display. When the irradiation of ultraviolet rays is performed as described above, the ultraviolet polymerizable compound is cured after phase-separated from the dispersion liquid 2, so that the above described film is formed and creates a closed space with the partition member 6, thus suppressing movement of the charged particles 3 toward another pixel portion. Incidentally, the ultraviolet polymerizable compound before the curing may preferably be liquid and is required to have a small affinity with the charged particle 3 and not to dissolve the charged particles 3 as its characteristics. Ass such an ultraviolet polymerizable compound, it is possible to utilize, e.g., 2-hydroxyethyl methacrylate, 1,4-butanedioldiglycidyl ether diacrylate, polyethylene glycol monomethacrylate (e.g. Blenmer PE series, mfd. by NOF Corp.).

Next, a specific embodiment of the production process of the electrophoretic display will be supplementally described.

In the case of the electrophoretic display shown in FIG. 5, the second electrode 4b is formed in a pattern on the surface of the substrate 1b and thereon the insulating layer 5a is formed as desired, and the partition member 6 is further formed thereon. On the other substrate 1a, the first electrode 4a and the insulating layer 5a are formed. Thereafter, the transfer step etc. described above is effected. For the bonding of substrates, an adhesive (which is cured by heat or ultraviolet rays) is used.

In the case of the electrophoretic display shown in FIG. 6, the first electrode 14a, the insulating layer 15a, the second electrode 14b, the insulating layer 15b and the partition member 6 are formed on the surface of the substrate 1b. Thereafter, the above mentioned transfer step etc. is formed. An adhesive (which is cured heat or ultraviolet rays) is used for bonding the substrates.

Next, effects of this embodiments will be explained.

According to this embodiment, it is possible to control the charge amount and the arrangement density of the charged particles attached to the first substrate B, so that an electrophoretic display with good image display qualities can be produced.

Hereinbelow, the present invention will be described more specifically based on Examples.

EXAMPLE 1

In this example, a vertical movement-type electrophoretic display D1 shown in FIG. 5 was prepared.

On a rear substrate 1b, a second electrode 4b was formed at a portion corresponding to each pixel area, and the second electrode 4b was coated with an insulating layer 5b.

On an entire surface of the other display substrate 1a, a first electrode 4a was formed, and an insulating layer 5a was formed on the surface of the first electrode 4a. As the display substrate, 10 μm-thick polycarbonate (PC) film was used and as the near substrate, 0.5 μm-thick stainless steel sheet was used. As the first electrode 4a, a transparent electrode of ITO (indium tin oxide) was used and as the second electrode 4b, an Al electrode was used. As the insulating layers 5a and 5b, a film of transparent acrylic resin was used. On the surface of the insulating layer 5b of the rear substrate 1b, a 20 μm-thick partition member 6 of photosensitive epoxy resin was formed.

Then, onto the insulating layer 5a of the display substrate 1a, charged particles 3 and a dispersion liquid 2 for migration were attached by using a production apparatus as shown in FIG. 1.

As an adsorption member of this apparatus, an adsorption roller 21 to be rotationally driven was used and around the adsorption roller 21, a charger 220 for electrically charging the roller surface to a uniform potential, a laser light irradiation device 221, and a storage tank 20 containing the charged particles 3 and the dispersion liquid 2 were disposed.

When the adsorption roller 21 was rotated in a clockwise direction, the roller surface was successively charged by the charger 220 and irradiated with light by the laser light irradiation device 221, whereby an electrostatic latent image was formed (electrostatic latent image forming step). Thereafter, the adsorption roller 21 was immersed in the dispersion liquid 2 to attach the charged particles 3 onto the roller surface (developing step).

On the other hand, by corona discharge, the surface of the insulating layer 5a of the display substrate 1a was electrically charged to the same polarity as the electrostatic latent image, and the display substrate 1a was moved in an indicated arrow in synchronism with rotation of the adsorption roller 21. At this time, a closest gap between the display substrate 1a and the adsorption roller 21 was set to 50 µm. As a result, the charged particles 3 were transferred together with the dispersion liquid 2 onto the display substrate 1a surface (transfer step).

Incidentally, in the storage tank 20, the charged particles 3 having a larger charge amount were liable to be attached to the roller surface and classified during the process. Further, the charged particles 3 were appropriately stirred in the storage tank 20 to suppress sedimentation of the charged particles 3.

On the other hand, after completion of the transfer step, an appropriate amount of the dispersion liquid 2 was added to the display substrate 1a.

Thereafter, the rear substrate 1b was bonded to the display substrate 1b to seal the charged particles 3 and the dispersion liquid 2.

In this example, as the dispersion liquid 2, a dispersion liquid colored with a blue dye was used. Further, the charged particles 3 was principally comprised of white titanium oxide mixed with a negative charge control agent, and thus showed a negative chargeability in the dispersion liquid 2.

In the thus prepared electrophoretic display, the charge amount of the charged particles 3 filled therein were controlled to exhibit uniform configuration (arrangement) density.

When the electrophoretic display was driven by applying a voltage (potential difference) of 20 V between the first and second electrodes 4a and 4b, it becomes possible to effect good display of images with no display unevenness caused by a change in particle density distribution.

EXAMPLE 2

Figure 2:
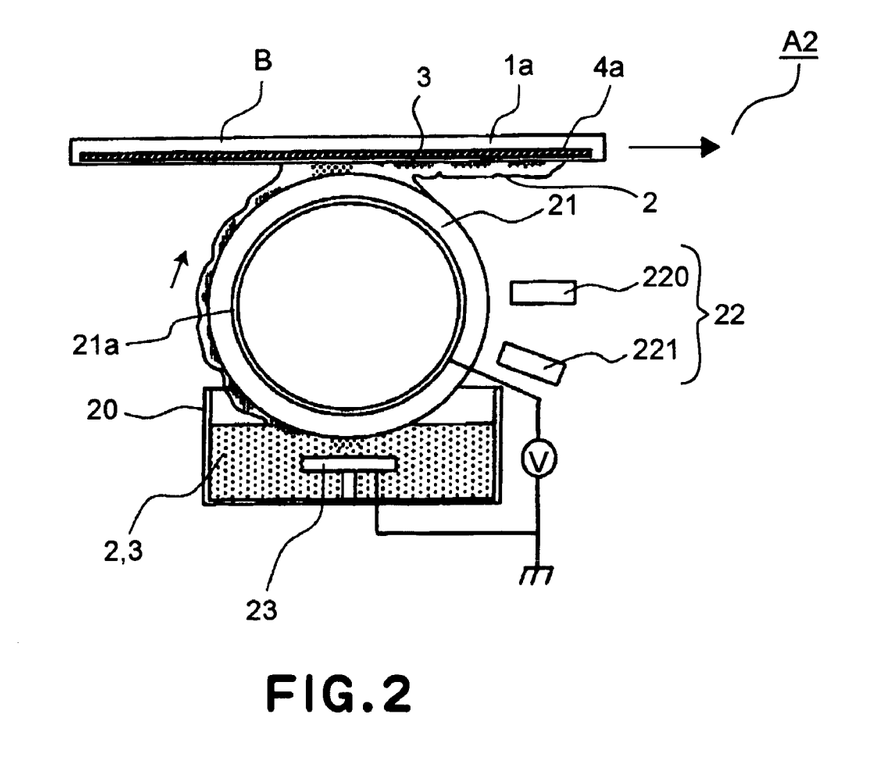

In this example, an electrophoretic display D1 having structure shown in FIG. 5 was prepared in the same manner as in Example 1 except that the transfer of the charged particles 3 was effected by using a transfer apparatus shown in FIG. 2.

More specifically, an adsorption control electrode 23 was disposed opposite to the adsorption roller 21 in this storage tank 20, and a voltage was applied between the electrode 21a on the adsorption roller side and the adsorption control electrode 23 to control a migration speed of the charged particles 3.

According to this example, it was possible to effect classification of the charged particles in a short time. Further, the same effect as in Example 1 was also attained.

EXAMPLE 3

In this example, an electrophoretic display having a structure shown in FIG. 5 was prepared in the same manner as in Example 2 except that an electrostatic latent image was removed by irradiating the adsorption member 21 with light at the time of transfer of the charged particles 3 onto the first substrate.

As a result, an attractive force from the adsorption roller 21 to the charged particles 3 was reduced or removed, so that it becomes possible to smoothly move the charged particles 3 from the surface of the adsorption roller 21 to the first substrate.

In this example, the adsorption roller 21 after completion of the transfer step was subjected to a cleaning step to remove the charged particles 3. The adsorption roller 21 may further be subjected to a charge removing step for effecting charge removal from the electrostatic latent image.

When a potential difference of 10 V was applied between the first and second electrodes 4a and 4b to drive the above-prepared electrophoretic display, it was possible to display good images free from display unevenness caused due to particle density distribution change.

EXAMPLE 4

In this example, a horizontal movement-type electrophoretic display D2 shown in FIG. 6 was prepared.

On an almost entire surface of a rear substrate 1b of polyethylene terephthalate (PET), a first electrode 14a of Al was formed. On the surface of the first electrode 14a, a lower insulating layer 15a (as a white scattering layer) of acrylic resin containing titanium oxide ($TiO_2$) was formed. Further, on the surface of the insulating layer 15a, a second electrode 14b of Ti was formed in an area corresponding to each pixel area (minute area) and thereon, an upper insulating layer 15b of transparent acrylic resin was formed. Thereafter, at a boundary portion between adjacent pixel areas, a partition wall 6 of silicone rubber having a height of 30 µm was formed.

Then, onto the upper insulating layer 15b of the rear substrate 1b, charged particles 3 and a dispersion liquid 2 for migration were attached by using an apparatus shown in FIG. 3.

The charged particles 3 were particles of polystyrene-polymethylmethacrylate copolymer resin containing carbon black (particle size: 1–2 µm; negatively chargeable in the dispersion liquid 2). The dispersion liquid 2 was isoparaffin (trade name: "Isopar", mfd. by Exxon Corp.) containing succinimide (trade name: "OLOA 1200", mfd. by Chevron Corp.) as a charge control agent.

The apparatus included an adsorption member 31 in the form of a plate and an electrode 31a disposed backside of the adsorption member 31 as shown in FIG. 3(*a*). The apparatus further included a charger 220, a laser light irradiation device 221, and a storage tank 30 which were disposed opposite to the adsorption member 31. The storage tank was provided with a nozzle 31. The storage tank was provided with a nozzle 30a at its bottom.

When the charger 220 and the laser light irradiation device 221 were scanned, an electrostatic latent image was formed (electrostatic latent image forming step), and onto the electrostatic latent image, the charged particles 3 and the dispersion liquid 2 were attached from the storage tank 30. In the storage tank 30, the charged particles 3 were stirred so as not to be settled down to the bottom.

After a predetermined amount of the charged particles 3 were adsorbed by the adsorption member 31 as described above and until a subsequent transfer step, the dispersion liquid 2 was sprayed onto the surface of the adsorption member 31 so as not to be evaporated during the period (not shown).

Thereafter, as shown in FIG. 3(b), the rear substrate 1b was disposed opposite to the adsorption member 31 with a spacing of about 50 μm so that the dispersion liquid 2 was filled in the spacing. A voltage of 100 V was applied between the electrodes 14a and 31a to move the charged particles 3 and the dispersion liquid 2 toward the rear substrate 1b.

After completion of the transfer step, the adsorption member 31 was subjected to the charge removing step and the cleaning step.

A display substrate 1a of polycarbonate (PC) was bonded to the rear substrate 1b to prepare an electrophoretic display.

In the thus prepared electrophoretic display, the filled charged particles 3 were charge-controlled and disposed at a uniform particle density even on the flexible substrate 1b. For this reason, when the electrophoretic display was driven by applying a potential difference of 12 V between the first and second electrodes 14a and 14b, it became possible to effect good image display without causing display unevenness by a change in particle density distribution.

EXAMPLE 5

In this example, an electrophoretic display having a structure shown in FIG. 5 was prepared. As charged particles 3, color particles of yellow, magenta and cyan were used and disposed pixel by pixel by utilizing an apparatus shown in FIG. 4.

In the same manner as in Example 1, the second electrode 4b and the insulating layer 5b were formed on the rear substrate 1b, and the first electrode 4a and the insulating layer 5a were formed on the display substrate 1a.

Figure 4:
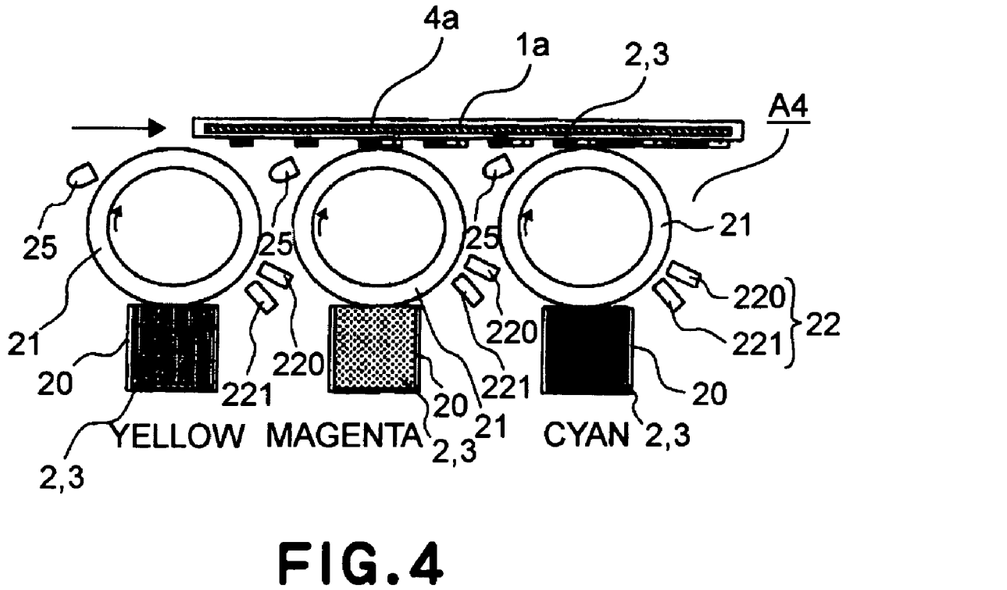

Then, the charged particles 3 and the dispersion liquid 2 were attached onto the insulating layer 5a of the display substrate 1a by using the apparatus shown in FIG. 4.

As shown in FIG. 4, the apparatus included three adsorption members 21 to be rotationally driven. Around each of the adsorption members 21, a charger 220, a laser light irradiation device 221, a storage tank 20 and UV irradiation device were disposed. In the storage tank 20, the charged particles 3 of an associated color were stored. The electrostatic latent image forming step, the developing step and the transfer step were performed in the same manner as in Example 1. In the transfer step, the display substrate 1a was moved in a direction of an indicated arrow, whereby three-color charged particles 3 were successively transferred onto the display substrate 1a.

In the storage tank 30, 2hydroxyethyl methacrylate (ultraviolet polymerizable compound) was added in advance in the dispersion liquid 2 so as to be transferred onto the substrate 1a together with the charged particles 3 and the dispersion liquid 2. At the time of transfer, electric charges of a polarity identical to that of the electrostatic latent image were provided to the display substrate 1a by corona discharge, and a closest gap between the display substrate 1a and the adsorption roller 21 was set to 50 μm. The transferred dispersion liquid 2 was irradiated with ultraviolet rays from the UV irradiation device 25, whereby a film of the ultraviolet polymerizable compound was formed at the surface of the dispersion liquid 2 to seal the charged particles 3 and the dispersion liquid 2.

The adsorption roller 21 after completion of transfer step was subjected to the cleaning step to effect removal of the charged particles 3 etc.

Thereafter, the rear substrate 1b was bonded to the display substrate 1a to seal the charged particles 3 etc., thus preparing an electrophoretic display.

According to this example, the respective color charged particles 3 are filled in associated pixels, respectively, without causing color mixing therebetween. As a result, the charge amount and the distribution density of the charged particles 3 were also appropriately controlled to provide good display qualities. When the electrophoretic display was driven by applying a potential difference of 10 V between the first and second electrodes 4a and 4b, it was possible to display good images with no display unevenness caused due to particle density distribution irregularity.

As described hereinabove, according to the present invention, it is possible to appropriately control the charge amount and the configuration density of the charged particles attached to the first substrate, so that it becomes possible to produce an electrophoretic display with good image density qualities.

What is claimed is:

1. A process for producing an electrophoretic display of the type wherein a dispersion liquid for migration and a plurality of charged particles are sandwiched between a first substrate and a second substrate, said process comprising:
   a latent image forming step of forming an electrostatic latent image on an adsorption member,
   a developing step of causing the adsorption member to contact the dispersion liquid in which the charged particles are dispersed, thereby to attach the charged particles together with the dispersion liquid onto a surface of the adsorption member on which the latent image is formed,
   a transfer step of transferring the charged particles from the surface of the adsorption member to the second substrate together with the dispersion liquid, and
   a sealing step of bonding the first substrate to the second substrate to seal the charged particles and the dispersion liquid, therebetween.

2. A process according to claim 1, wherein the dispersion liquid contains an ultraviolet curable resin, and said process further comprises an irradiation step of irradiating the ultraviolet curable resin with ultraviolet rays after said transfer step.

3. A process according to claim 2, wherein said latent image forming step, said developing step, said transfer step, and said irradiation step were repeated for each color of charged particles different in color.

4. A process according to claim 1, wherein said developing step is a step of adsorbing only charged particles having an electric charge amount larger than a predetermined electric charge amount, from the charged particles in the dispersion liquid.

5. A process according to claim 1, wherein before said transfer step, the surface of the second substrate is electrically charged to a polarity identical to that of the surface of the adsorption member.

6. A process according to claim 1, wherein the surface of the second substrate and the surface of the adsorption member have an identical wettability to the dispersion liquid.

* * * * *

UNITED STATES PATENT AND TRADEMARK OFFICE
CERTIFICATE OF CORRECTION

PATENT NO. : 7,184,196 B2
APPLICATION NO. : 10/765490
DATED : February 27, 2007
INVENTOR(S) : Nobutaka Ukigaya It is certified that error appears in the above-identified patent and that said Letters Patent is hereby corrected as shown below:

Title Page: Item (30) Foreign Application Priority Data

Please change "2003-0121007" to --2003-021007--.

Signed and Sealed this

Fifteenth Day of May, 2007

JON W. DUDAS
*Director of the United States Patent and Trademark Office*